United States Patent
Sakaue et al.

(10) Patent No.: US 6,738,503 B1
(45) Date of Patent: May 18, 2004

(54) NOTCH INSPECTION APPARATUS AND METHOD BASED ON SHADING PATTERN MATCHING

(75) Inventors: Yoshikazu Sakaue, Tokyo (JP); Toshiya Ijichi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 647 days.

(21) Appl. No.: 09/628,659

(22) Filed: Jul. 28, 2000

(30) Foreign Application Priority Data

Aug. 27, 1999 (JP) .......................................... 11-240846

(51) Int. Cl.[7] ................................................ G06K 9/00
(52) U.S. Cl. ...................... 382/145; 382/181; 382/209; 382/266; 382/274; 348/126
(58) Field of Search ................................. 382/145, 190, 382/181, 209, 274, 287, 15, 203, 173, 219, 174, 217, 266; 348/95, 126, 171; 356/390, 392, 394, 402, 237.1

(56) References Cited

U.S. PATENT DOCUMENTS

| | | | | | |
|---|---|---|---|---|---|
| 4,648,053 A | * | 3/1987 | Fridge | ........................ | 382/147 |
| 4,733,074 A | * | 3/1988 | Kato et al. | ................... | 250/307 |
| 4,817,184 A | * | 3/1989 | Thomason et al. | ......... | 382/141 |
| 5,717,785 A | * | 2/1998 | Silver | ......................... | 382/202 |
| 5,825,913 A | * | 10/1998 | Rostami et al. | ............. | 382/151 |
| 5,991,436 A | * | 11/1999 | Koljonen et al. | ........... | 382/150 |
| 6,240,208 B1 | * | 5/2001 | Garakani et al. | ........... | 382/190 |

* cited by examiner

*Primary Examiner*—Bhavesh M. Mehta
*Assistant Examiner*—Sheela Chawan
(74) *Attorney, Agent, or Firm*—McDermott, Will & Emery (57) ABSTRACT

A notch inspection method based on shading pattern matching for inspecting notches on semiconductor packages or like objects. A template is created to characteristically express brightness gradations of a notch edge in a picture, i.e., to represent the notch edge in pixels constituting contiguous bright and dark portions of the edge. The template may be created on the basis of notch size information or notch size measurements. The template is checked against pictures under inspection in shading pattern matching whereby presence of a notch is determined. Computations of shading pattern matching are omitted regarding portions of the notch edge where brightness remains unchanged.

7 Claims, 12 Drawing Sheets

FIG. 4(A)   TEMPLATE OF THE PRESENT INVENTION

FIG. 4(B)   TEMPLATE OF PRIOR ART

FIG. 4(C)   TEMPLATE DESIGNED TO MASK THE NOTCH INTERIOR TO KEEP ITS CENTRAL PORTION FROM BEING COMPUTED

1: SEMICONDUCTOR PACKAGE

FIG. 14

EFFECTIVE AREA OF TEMPLATE

NOTCH INSPECTION APPARATUS AND METHOD BASED ON SHADING PATTERN MATCHING

BACKGROUND OF THE INVENTION

1. Field of the Invention

The present invention relates to an apparatus and a method for inspecting notches on semiconductor packages or like objects by use of shading pattern matching.

2. Description of the Background Art

The surface of a semiconductor package molded of plastic resin is provided with a round or semicircular notch indicative of proper mounting orientation. The position of the notch plays an important role in correctly orienting the semiconductor package upon its mounting on a printed circuit board. It is also important to orient semiconductor packages correctly in containers for shipment from the factory.

Typically, the notch has a semicircular shape located on the periphery of the semiconductor package and measures about 1.2 mm in diameter, or a circular shape located near a package corner and measures about 2 mm across and 0.3 mm deep. For better visibility on some semiconductor packages, the bottom of each of their notches may be mirror finished while the package surfaces are satin finished.

Before shipment, semiconductor packages are inspected for the correct position of their notches. One of the most commonly used methods for inspection of this type is the so-called shading pattern matching method. Below is a brief description of how inspection equipment based on this method is typically structured and how it works.

Figure 1:
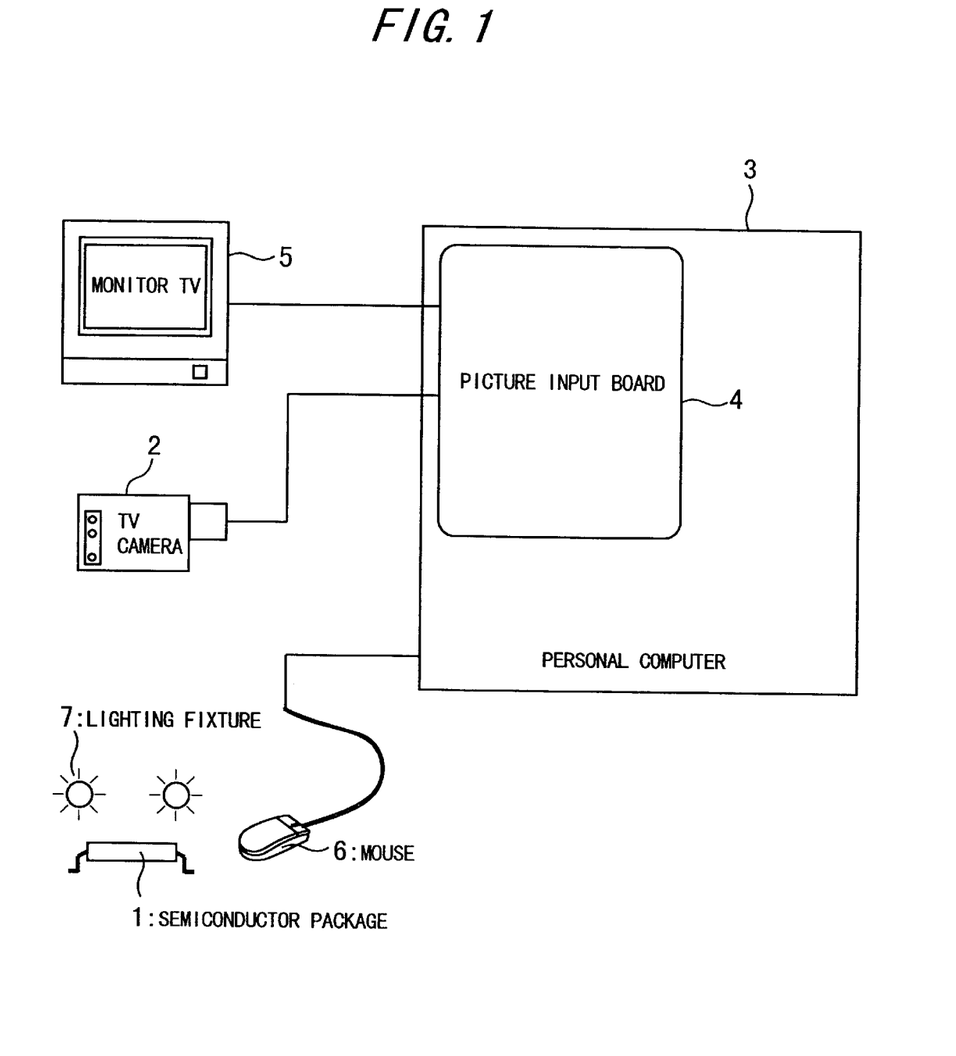
FIG. 1 is a schematic view of a typical configuration of apparatus for implementing a notch inspection method based on shading pattern matching embodying the invention.

(1) FIG. 1 is a schematic view of inspection equipment configured to inspect package notches. A TV camera 2 facing a semiconductor package 1 takes pictures of the package surface.

A lighting fixture 7 is used to stabilize the inspecting condition. An expansion slot of a personal computer 3 accommodates a picture input board 4 that receives a picture signal from the TV camera 2. The picture signal thus received is converted from analog to digital format before being transferred and written to a main memory of the personal computer 3. In the main memory, picture information is represented X and Y coordinates constituting respectively the lateral and longitudinal directions of a two-dimensional array (i.e., TV screen). The brightness of each pixel in the array is recorded illustratively as br[y][x] (br=bright). The field of view of the TV camera 2 is adjusted in such a manner that each of the pixels thereof measures 50 microns across on the surface of the semiconductor package. A mouse 6 is attached to the personal computer 1.

Figure 2:
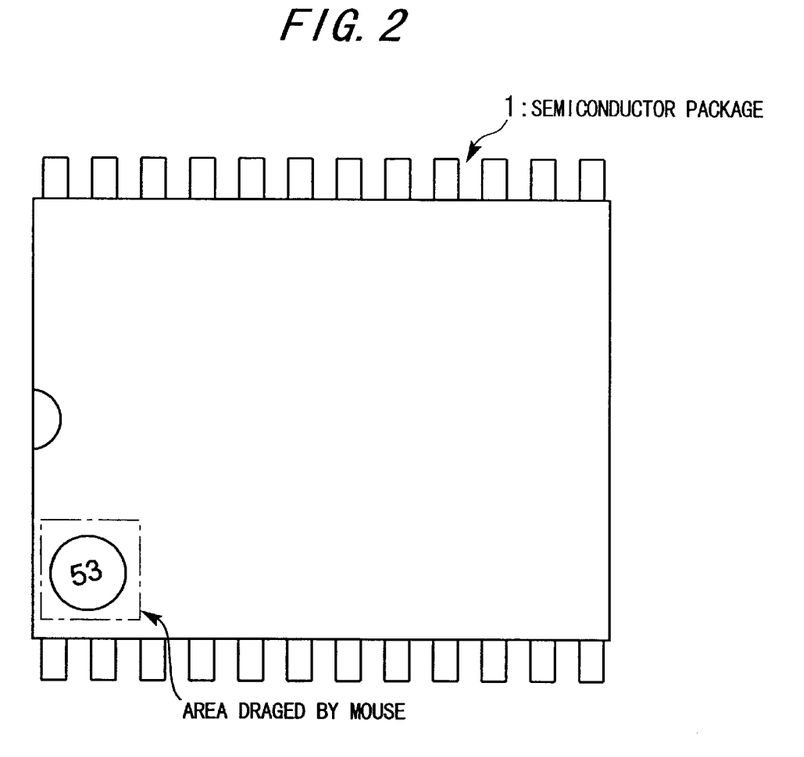
FIG. 2 is a plan view of a circular and a semicircular notch on a semiconductor package.

(2) As shown in FIG. 2, a picture of a first semiconductor package 1 is initially taken. An operator drags the mouse 6 to draw a periphery of the notch (indicated by dashed lines in FIG. 2) so that the personal computer 1 may recognize the position and range of the notch. Brightness information per pixel in that range is recorded as a template. In FIG. 4B, a densely shaded (i.e., dark) portion represents the notch and a thinly shaded (gray) portion denotes the package surface.

(3) For notch inspection from the next semiconductor package onward, the template is overlaid onto a two-dimensional array br[y][x] of each picture signal received. The degree of coincidence between the template and the input picture is acquired. Inevitably, a difference of about 0.5 mm must be taken into consideration between the notch position of the first package and that of the second package. That is because there exists some play in a positioning block that secures the periphery of each semiconductor package under TV camera. The template is shifted within a range measuring 0.25 mm in each of upper, lower, right-hand and left-hand directions (i.e., spanning 5 pixels) away from the putative central point where the notch is expected most likely to exist. The notch is judged located where the degree of coincidence is the highest. With five pixels checked in each of the four directions, it is necessary to compute the degree of coincidence 121 times for 11 pixels multiplied by 11 pixels.

(4) If the degree of coincidence is found acceptably high on a semiconductor package under inspection, that means the package in question has its notch located in substantially the same position as the first semiconductor package and that the device is judged to be correctly oriented. The degree of coincidence is computed using expression (1) below for the shading pattern matching method based on normalized correlation:

$$r^2 = \{n\Sigma fg - \Sigma f\Sigma g\}^2 / \{n\Sigma f^2 - (\Sigma f)^2\}\{n\Sigma g^2 - (\Sigma g)^2\} \quad (1)$$

where, $r^2$ stands for a score (degree of coincidence), "f" for the brightness of each pixel in an input picture, "g" for the brightness of each pixel in the template, and "n" for the number of effective pixels in the template.

Outlined above was the conventional method for notch inspection based on shading pattern matching. This method has the following major disadvantages:

(1) When semiconductor devices are molded of plastic resin, their circular notches typically double as ejector pins. As such, the circular notches often have the name of the country of manufacture or forming-mold numbers engraved therein. The country name and forming-mold numbers may or may not be engraved in the same direction in all molds. Because forming-mold numbers differ from one package to another, utilization of a template created at the time of inspecting the first semiconductor package can worsen the degree of notch coincidence from the second semiconductor package on. Such a template is not suitable for checking the presence or absence of notches.

Figure 3:
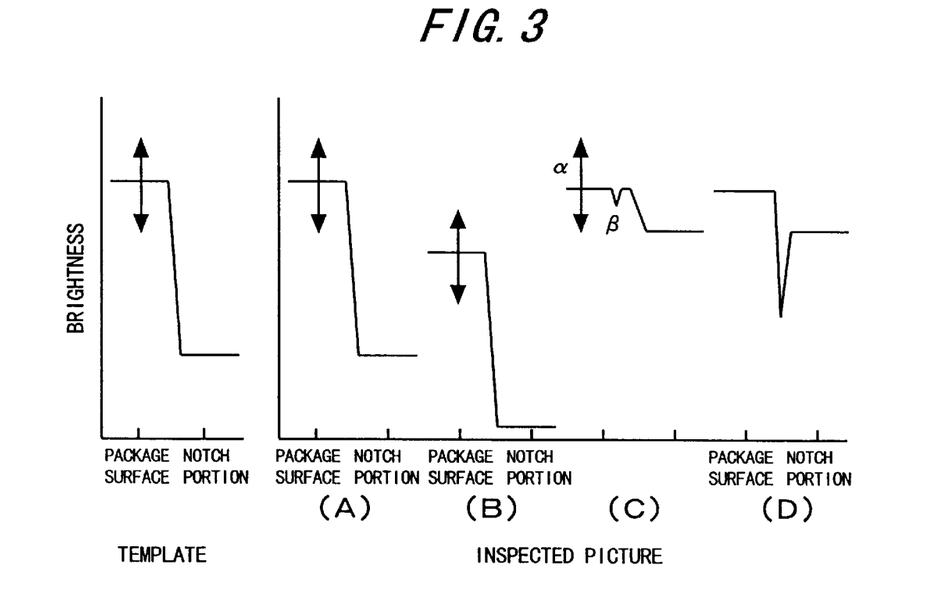
FIGS. 3A through 3D are graphic representations showing brightness changes of notch edges on semiconductor packages.

(2) Where the plastic mold surface is satin finished while the notch bottom is mirror finished, a picture taken by TV camera typically shows a gray mold surface in combination with a black notch bottom. When the forming-mold is used for an extended period of time, however, the mirror finished portion may deteriorate by wear and cease to be mirror finished. When taken by TV camera, the worn mirror finished portion may actually appear gray resembling the satin finished plastic mold portion that originally appears gray. The arithmetic expression (1) for the above-described pattern matching method based on normalized correlation proves to be 100 percent accurate when the template differs relatively from the input picture under inspection in terms of brightness, as shown in FIG. 3B. Where the amount of brightness changes diminishes as shown in FIG. 3C, the expression is still 100 percent accurate. As long as brightness changes fall within a range (β) indicated by a thick line arrow, the arithmetic expression applies 100 percent. The problem is that the brightness of the satin finished portion varies in a range (α) indicated by thin line arrows. That is, if the brightness of the satin finished portion becomes the same as that of the notch bottom, the degree of coincidence worsens and the arithmetic expression above cannot be applied to the inspection for the presence or absence of notches.

(3) It is common practice to form the notch surface dipped about 0.3 mm from the level of the plastic mold surface. A staggered slope thus formed usually appears black in a picture taken by TV camera. As described in the preceding paragraph (2), if there is little difference in brightness between the package surface and the notch portion, the presence of the staggered slope in black worsens the degree of coincidence, which makes it impossible to check the presence or absence of notches. (4) The slope representing the difference in elevation between the plastic mold surface and the notch portion may appear white reflecting the illumination in a picture. This also deteriorates the degree of coincidence and makes it impossible to check the presence or absence of notches.

SUMMARY OF THE INVENTION

It is therefore an object of the present invention to overcome the above and other deficiencies of the prior art and to provide an apparatus and a method for notch inspection unaffected by engraved characters inside the notch so that the degree of coincidence remains undegraded in judging the presence or absence of notches on packages.

It is another object of the present invention to provide an apparatus and a method for notch inspection unaffected by little difference in brightness change between the satin finished mold surface and the notch bottom so that the degree of coincidence remains undegraded in judging the presence or absence of notches.

It is a further object of the present invention to provide an apparatus and a method for notch inspection for preventing the degree of coincidence from getting worsened by the presence of a staggered slope appearing black where there is little difference in brightness between the package surface and the notch portion.

It is an even further object of the present invention to provide an apparatus and a method for notch inspection unaffected by the slope of the notch appearing white upon reflecting illumination so that the degree of coincidence remains undegraded in judging the presence or absence of notches.

The above objects of the present invention are achieved by a notch inspection apparatus for inspecting notches of target objects based on shading pattern matching. The apparatus includes a unit for creating a template which characteristically represents brightness-varying portions on a notch edge. A camera is provided for taking a picture to be inspected of the target object. The apparatus also includes a unit for performing shading pattern matching between the template and the picture to be inspected. The apparatus further includes a unit for determining the presence of a notch on the target object based on the result of the shading pattern matching.

The above objects of the present invention are achieved by a notch inspection method for inspecting notches of target objects based on shading pattern matching. In the method, there is created a template which characteristically represents brightness-varying portions on a notch edge. A picture to be inspected of the target object is taken by using a camera. Shading pattern matching between the template and the picture to be inspected is performed. The presence of a notch on the target object is determined based on the result of the shading pattern matching.

Other objects and further features of the present invention will be apparent from the following detailed description when read in conjunction with the accompanying drawings.

DESCRIPTION OF THE PREFERRED EMBODIMENTS

First Embodiment

In practicing the first embodiment of this invention, one disadvantage of the prior art as discussed in the foregoing paragraph (1) is overcome by not computing the degree of coincidence during shading pattern matching with respect to a character-engraved portion of the notch interior. The nonexecution of computations is declared for computing software by writing zeros to template portions where characters appear. That is, pattern matching computations skip over those pixels in the template to which zeros have been written. In such a case, the template appears as shown in FIG. 4C, where a square encompasses the template and where computations skip over a central white portion with zeros written therein.

Another disadvantage of the prior art discussed in the foregoing paragraph (2), i.e., the inability to recognize the notch portion because of its brightness approaching that of the semiconductor package surface, is overcome by taking advantage of the fact that the staggered slope described in the foregoing paragraph (3) appears black in a picture. That is, the difference in brightness discussed as a disadvantage in the paragraph (2) above in reference to FIG. 3C is discarded in favor of the darkening phenomenon in FIG. 3D. The difference in brightness in FIG. 3D is several times as large as that in FIG. 3C, which offers an obvious advantage in terms of inspection. To utilize this phenomenon requires making the densely shaded portion shown in FIG. 4C as narrow as possible.

Figure 4A:
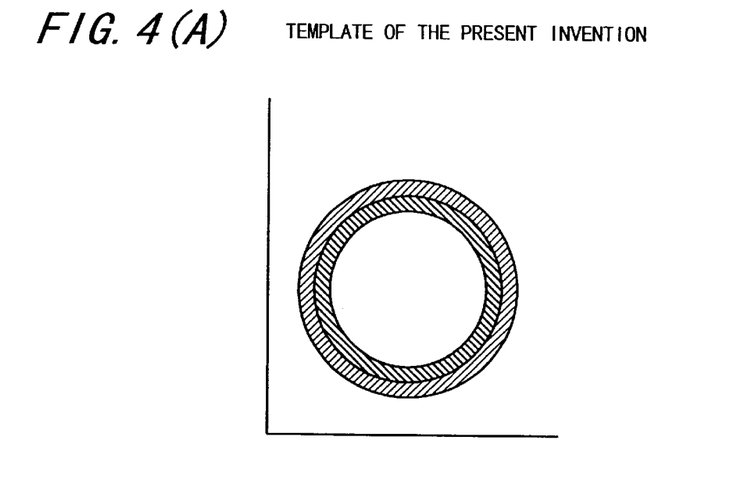
FIGS. 4A, 4B and 4C are schematic views depicting respectively a template according to the invention, a conventional template, and a template designed to mask the notch interior to keep its central portion from being computed.
Figure 4B:
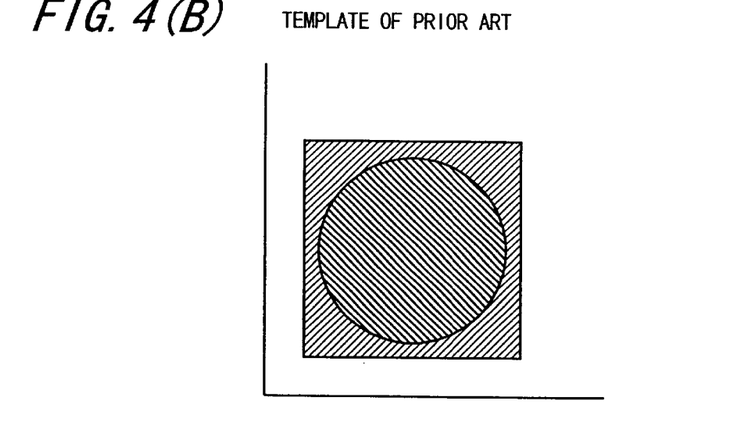
Figure 4C:
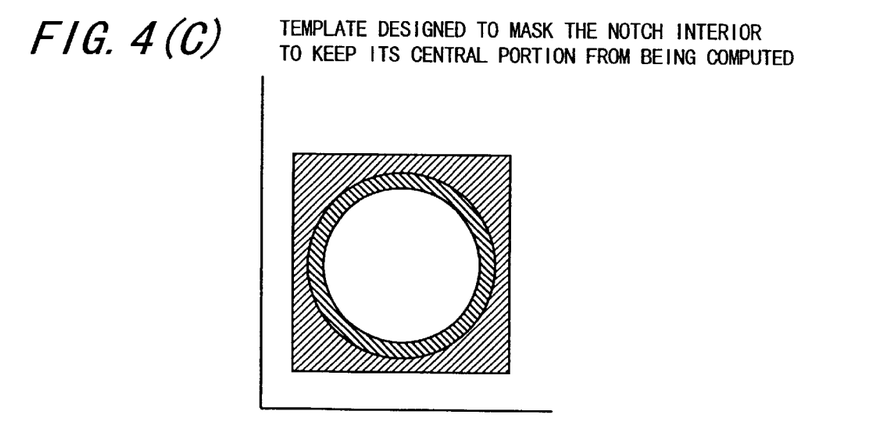
Figure 5:
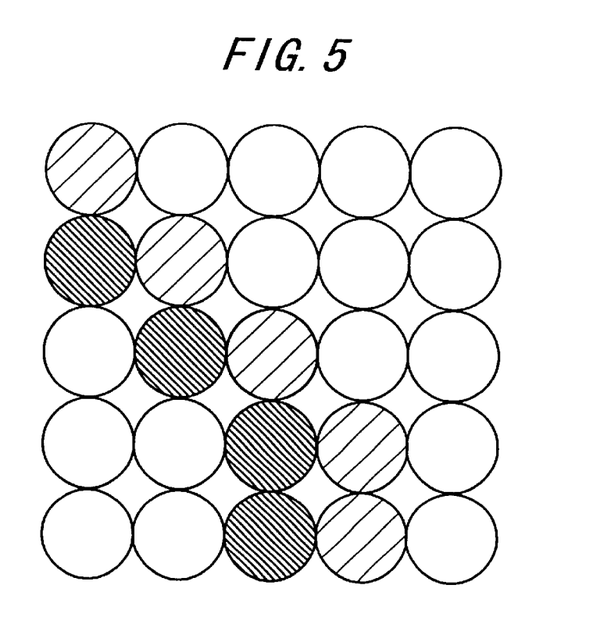
FIG. 5 is an enlarged view of the template shown in FIG. 4C.

The idea above extends to the narrowing of the thinly shaded portion of FIG. 4C into the pattern of FIG. 4A. This practice only shows that brightness has dropped abruptly in a very limited region, corresponding to the precipitous decline in brightness depicted in FIG. 3D. The practice waives the use of a package surface portion where the satin finish provokes appreciable changes in brightness (indicated by thin line arrows in FIGS. 3A through 3C), and adopts instead an inner portion where brightness is lowered abruptly for inspection purposes. This makes it possible to make judgments on the presence of notches in a stable fashion without worsening the degree of coincidence in pattern matching. FIG. 5 is an enlarged view of the template in FIG. 4A. In FIG. 5, each circle represents one pixel. A densely shaded circle stands for a low level of brightness and a thinly shaded circle for a high level of brightness. Blank circles are skipped upon pattern matching computations.

Described below in specific terms are proceedings based on the above-described concept of notch inspection on packages by use of the first embodiment.

Figure 6:
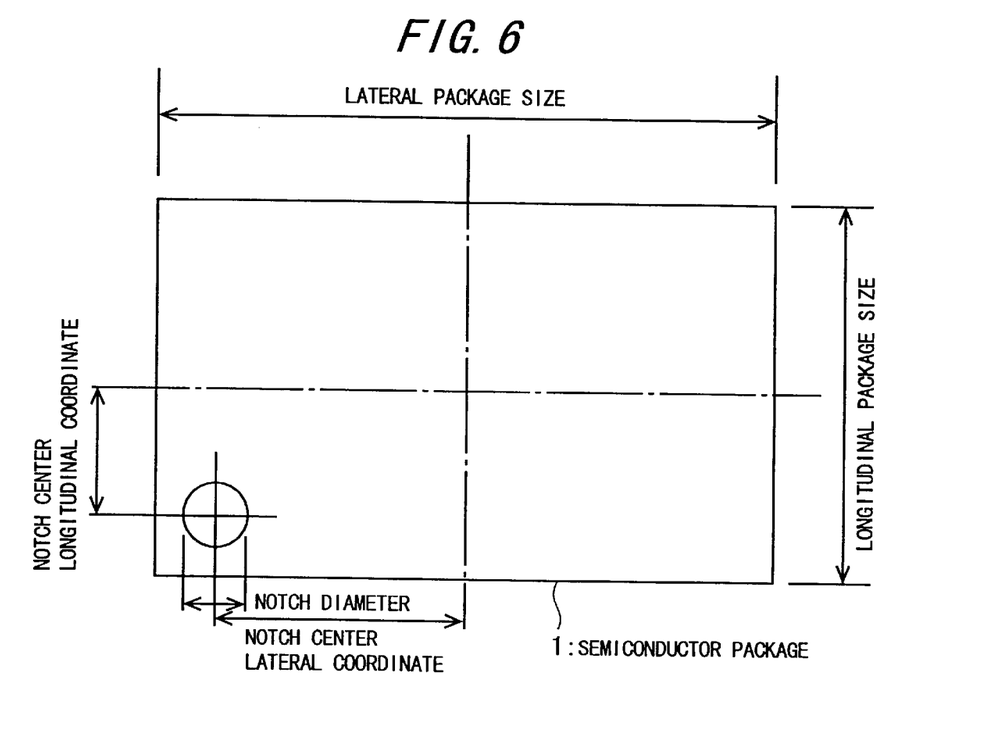
FIG. 6 is a schematic view indicating semiconductor package dimensions that are stored in advance for use by a first embodiment of the invention.

1. A computer memory is arranged to store such surface dimensions of the semiconductor package 1 as those shown in FIG. 6, e.g., lengthwise and lateral sizes of the package, notch diameter, and notch center coordinates. The memory is also arranged to record the magnifying power of the TV camera 2 in terms of how many microns exist per pixel.

2. The diameter of the notch is divided by the magnifying power of the TV camera so as to indicate how many pixels constitute the radius of the notch.

Figure 7:
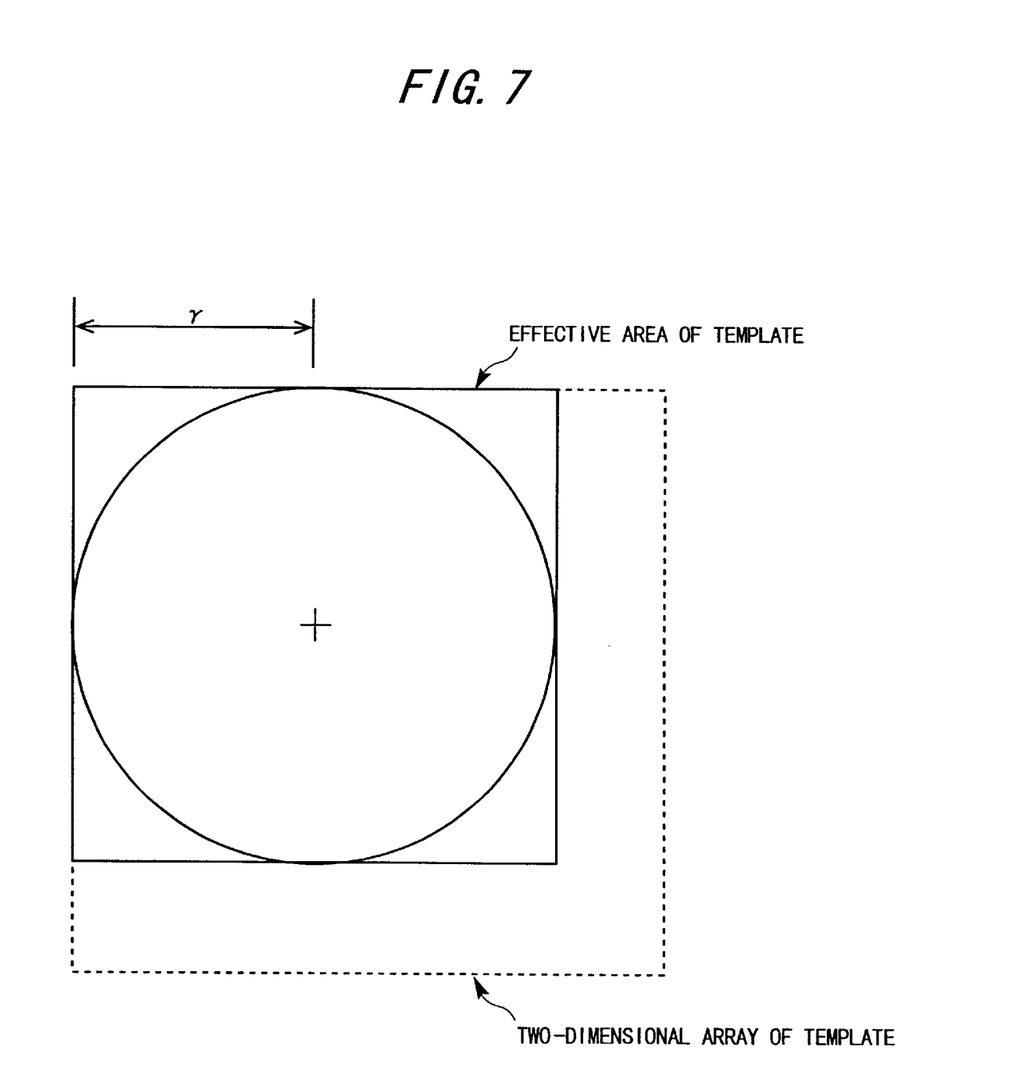
FIG. 7 is a schematic view depicting details of an array made into a computer program as a template for use by the first embodiment.

3. A template is created to carry out shading pattern matching on input pictures. The specific steps involved are as follows:

3.1) A maximum notch size and the magnifying power of the camera are taken into consideration as a basis for determining the maximum number of pixels in the template, and the sizes of a two-dimensional array constituting the template for use by a program are determined. FIG. 7 illustrates the array that is stored as the template into the computer program.

Figure 8:
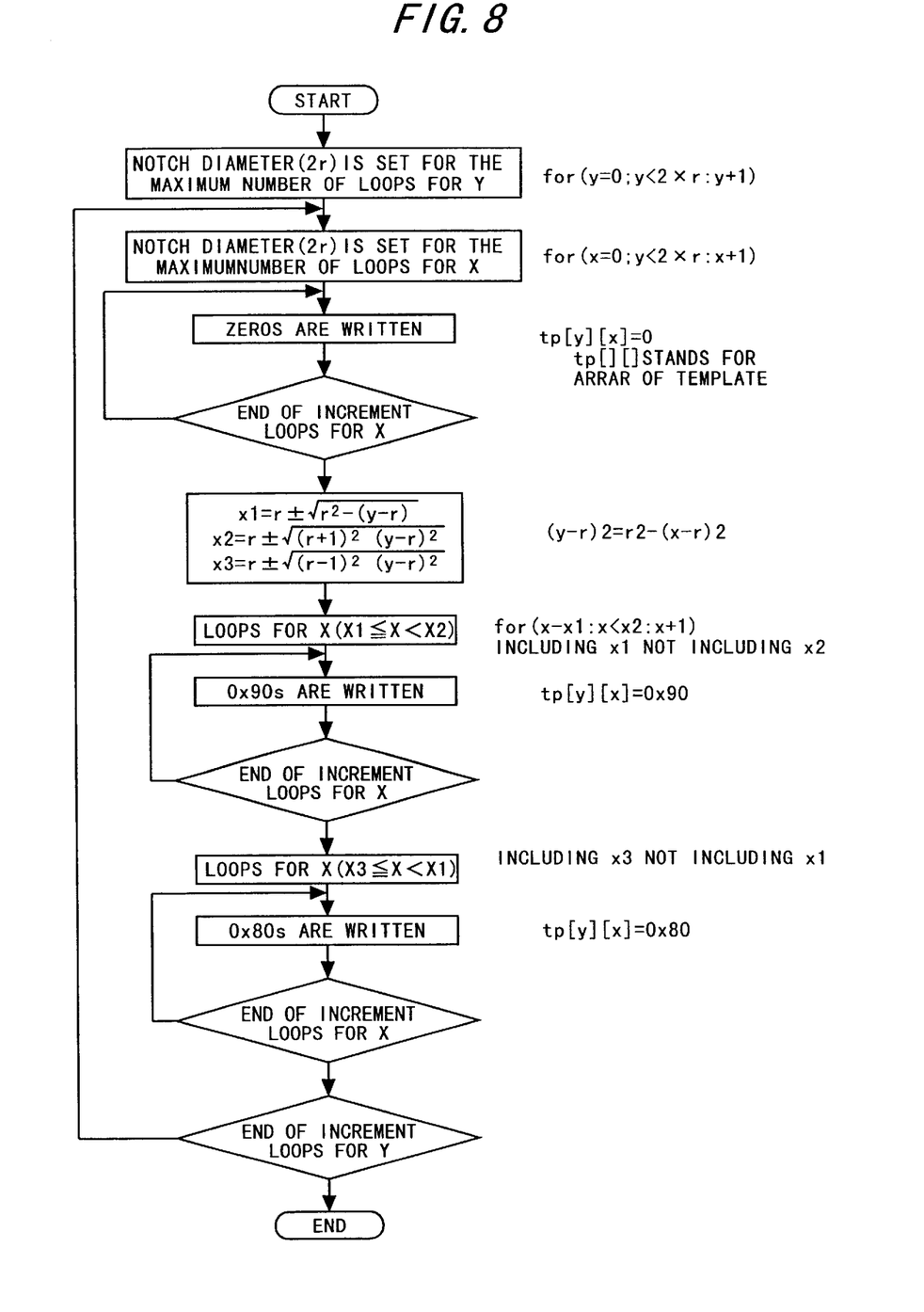
FIG. 8 is a flowchart of steps constituting a program for creating the template for use by the first embodiment.

3.2) The two-dimensional array of the template is created using X and Y coordinates as shown in the flowchart of FIG. 8 and based on the expression (2) below, the X and Y coordinates representing respectively the rightward direction and the downward direction of an input screen:

$$r^2 = X^2 + y^2 \quad (2)$$

where, "r" stands for the notch radius (expressed by the number of pixels).

The steps in the flowchart of FIG. 8 will now be described. The right-hand portion of FIG. 8 shows a C-coded equivalent of the flowchart for illustration purposes.

3.3) The number of loops for Y is set for 2r. That is, the diameter of the notch is set for a maximum.

3.4) The number of loops for X is set for 2r. That is, the notch diameter is maximized.

3.5) Zeros are written in portions of an array tp[y][x] in which the value Y ranges from 0 to 2r or the value X ranges from 0 to 2r. In other words, zeros are written to an effective template area shown in FIG. 7.

3.6) Every time loops are changed for Y, x1, x2 and x3 corresponding to "y" values are computed. The value x1 represents the "x" position corresponding to the "y" value on a circle with a radius of "r"; the value x2 denotes the "x" position corresponding to the "y" value on a circle with a radius of "r+1"; and the value x3 stands for the "x" position corresponding to the "y" value on a circle with a radius of "r−1."

3.7) In loops in which X increases successively from x1 to x2 (excluding x2), hexadecimal numbers 90 are written to the array tp[y][x]. That is, the numbers 90 are written to an outer ring portion (thinly shaded portion) in the template of FIG. 4A. Likewise, hexadecimal numbers 80 are written to the array tp[y][x] from x3 to x1 (excluding x1). That is, the numbers 80 are written to an inner ring portion (densely shaded portion) in the template of FIG. 4A.

3.8) When the value "y" reaches the targeted 2r, the template is completed.

4. At the start of inspection through shading pattern matching, a first semiconductor package is set under the TV camera 2. The first package as well as second and subsequent semiconductor packages should each be placed illustratively in a positioning block so that each block will be secured in approximately the same position. A picture signal received from the TV camera 2 is displayed on a TV monitor 5. On the same monitor screen, a square plotted by dragging the mouse 6 is also displayed to enclose the notch circumference. The screen location inside the dragged square is retained in the computer.

5. The first semiconductor package in the positioning block is replaced by a second package for another session of picture taking.

6. In considering repeatability of semiconductor package positioning (i.e., with the play of the positioning block corresponding to its backlash taken into account), maximum allowances are set for predictable divergences in notch position between the first package and the next package.

Figure 9:
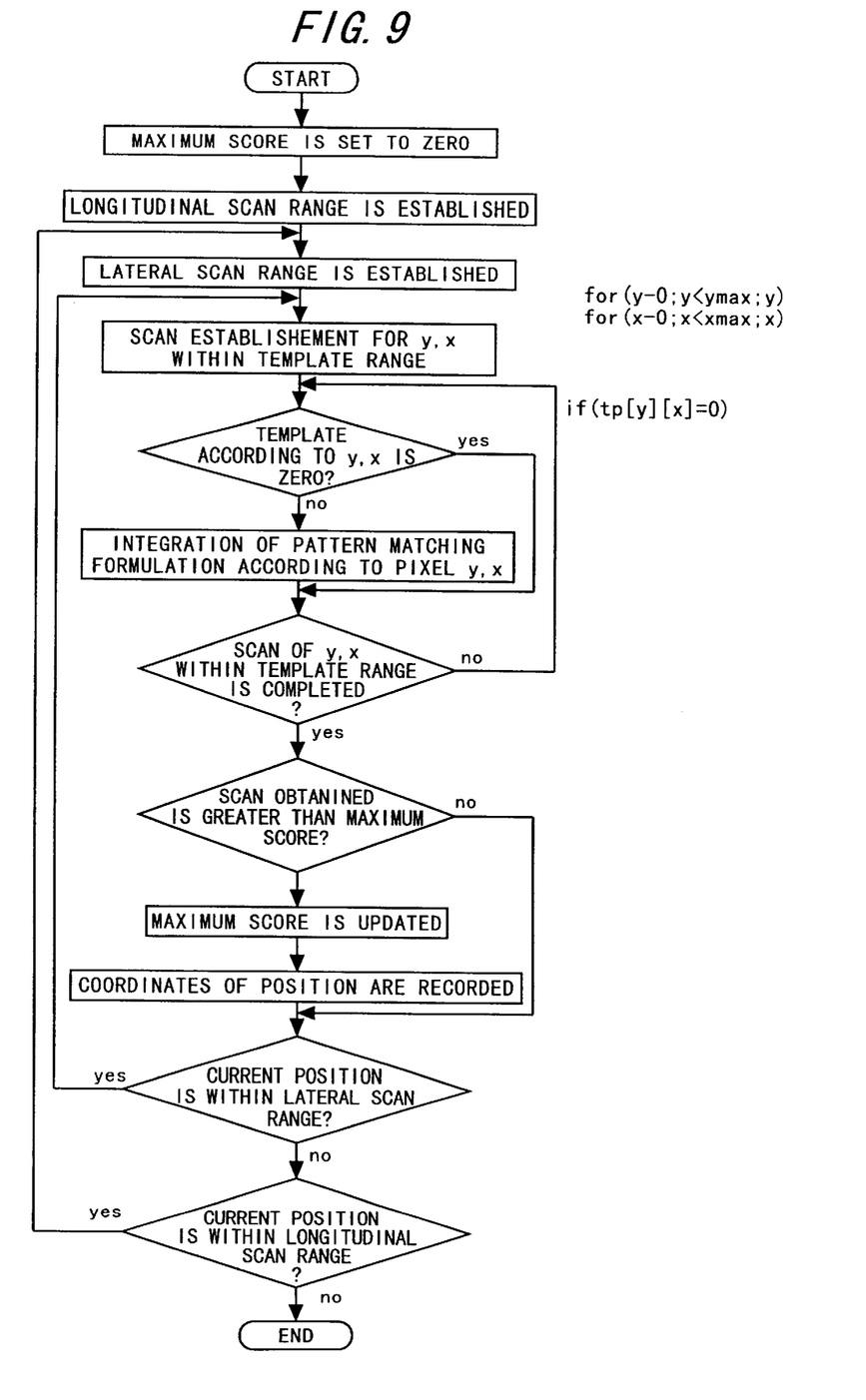
FIG. 9 is a flowchart of steps for template matching according to the first embodiment.

7. The template is sequentially applied to the pictures input within the maximum ranges of predictable divergences in notch position to obtain a position where the input picture is most likely resemblance to the template. Specific steps to be taken are as follows (shown in the flowchart of FIG. 9):

7.1) A maximum score value is initially set to zero.

Maximum divergence ranges are then set around the point where the notch of the first semiconductor package has appeared.

Specifically, a maximum range of longitudinal scan and a maximum range of lateral scan are established.

7.2) Pattern matching is carried out by resorting to the method called shading pattern matching based on normalized correlation. The expression (1) below is used to compute the degree of coincidence in shading pattern matching:

$$r^2 = \{n\Sigma fg - \Sigma f\Sigma g\}^2 / \{n\Sigma f^2 - (\Sigma f)^2\}\{n\Sigma g^2 - (\Sigma g)^2\} \quad (1)$$

where, $r^2$ stands for a score (degree of coincidence), "f" for the brightness of each pixel in an input picture, "g" for the brightness of each pixel in the template, and "n" for the number of effective pixels in the template.

Computations using the above expression are not performed on those pixels in the template which have zeros written therein.

7.3) If the score obtained by the computations above is judged greater than the initially established maximum score value, then the maximum score value is updated to reflect the acquired score. The longitudinal and lateral coordinates of the position in effect at that point are recorded.

7.4) Within the range of lateral scan, the current position is advanced right one pixel, and the computations of (7.2) and (7.3) above are repeated.

7.5) If the range of lateral scan is found exceeded, a check is made to see if the current position is still within the range of longitudinal scan. If the current position is judged to be within the longitudinal scan range, the position is moved down one pixel, and lateral scan is repeated from the leftmost position toward the rightmost position.

7.6) When the longitudinal scan range is judged to be completed, the processing is brought to an end.

8. The maximum score value eventually obtained above represents the degree of coincidence between the template created in paragraph 3 above on the one hand and the input picture of the second semiconductor package on the other hand. The higher the degree of coincidence or resemblance, the greater the score value. The most likely resemblance is defined by the score value of 1.0; decimal scores denote less likely resemblances. Where the score value is at least 0.3 under ordinary conditions, the notch position on the current semiconductor package may be judged to be the same as that on the first semiconductor package.

9. The same inspection is carried out on a third device. The processing is repeated as long as the packages of the same type are not exhausted.

A variation of the first embodiment is described below.

Figure 10:
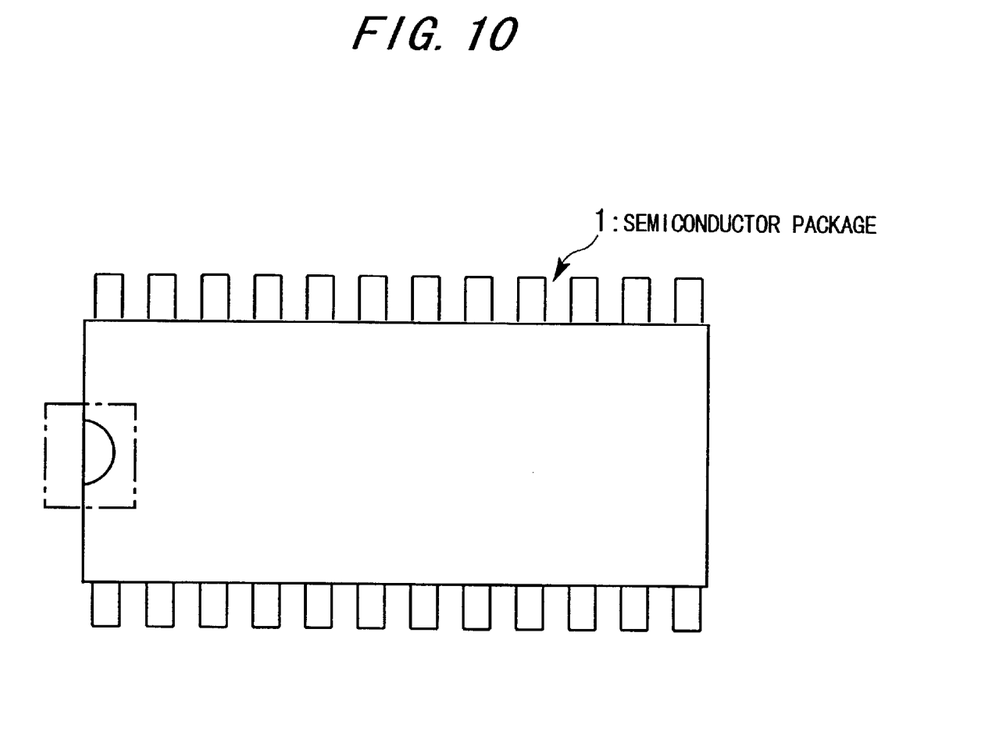
FIG. 10 is an explanatory view of a semicircular notch for inspection by a variation of the first embodiment.

1. Whereas the circular notch was discussed above, the invention may also be applied similarly to a semicircular notch formed on an edge of the semiconductor package as shown in. FIG. 10.

Figure 11:
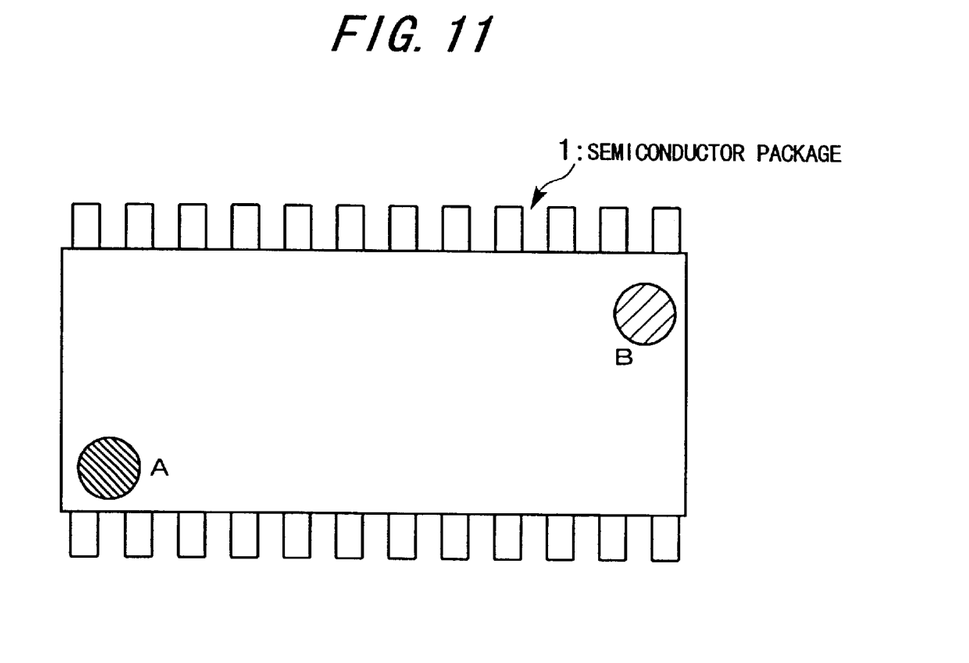
FIG. 11 is an explanatory view of a semiconductor package oriented inversely for inspection by another variation of the first embodiment.

2. Notch inspection is intended to make sure that semiconductor packages are not inversely oriented when shipped to users. To ascertain that the package is not upside down or otherwise disoriented involves carrying out the following checks: an inverted package exhibits in position B its notch that should normally be in position A in FIG. 11. Such disorientation is prevented illustratively by regarding a package as correctly oriented if its score value is at least 0.3 in position A and at most 0.15 in position B.

3. Three templates may illustratively be prepared: a template to the exact drawing size of the notch (diameter), a template 0.1 mm larger than the notch, and a template 0.1 mm smaller than the notch. Matching is carried out using all three templates, and the highest score is adopted. This technique enhances the reliability of notch inspection. As an alternative, the greater-or smaller-size template may be resorted to only if good scores are not obtained with the exact-size template.

4. The first embodiment was described above in connection with the use of a mouse for inputting notch position data about a first semiconductor package. Alternatively, the use of the mouse may be waived in favor of storing package dimensions into the computer beforehand.

5. In the description above, the portion not subject to computations for pattern matching was represented by zeros written into the relevant part of the template. Alternatively, numbers other than zeros may be written.

6. In the foregoing description, the previously recorded notch dimensions were used to prepare the template. Alternatively, the template may be created by use of information acquired from an input picture of a first semiconductor package.

As described, the first embodiment provides the following major advantages:

1. Because only the peripheral region of the notch is used for matching, the presence of engraved characters inside a circular notch does not impede acquisition of high matching scores. This allows notch inspection to proceed without dealing with conventionally experienced irregularities.

2. Whereas the conventional template pattern matching makes use of the brightness on the surface of the plastic mold as well as the brightness on the plane inside the notch, the first embodiment above utilizes for matching purposes the abrupt drop in brightness on the boundary between the plastic mold surface and the notch. This makes it possible constantly to acquire high score values.

Second Embodiment

The shading pattern matching method based on normalized correlation could yield high scores where there is a match between the template and an input picture in terms of the ratio of brightness changes even if the changes are small. When a particularly simplified template such as that of the first embodiment is used, the number of pixels inspected is appreciably limited. In such a case, there is a remote possibility—but a possibility nonetheless—that a plastic mold plane with no notch thereon may produce an unexpectedly high score in a spot in which no difference can be observed by naked eyes through use of a monitor TV. In other words, an inversely oriented semiconductor package could yield a score high enough to corroborate falsely the presence of a nonexistent notch where there actually is only the mold plane.

Figure 12:
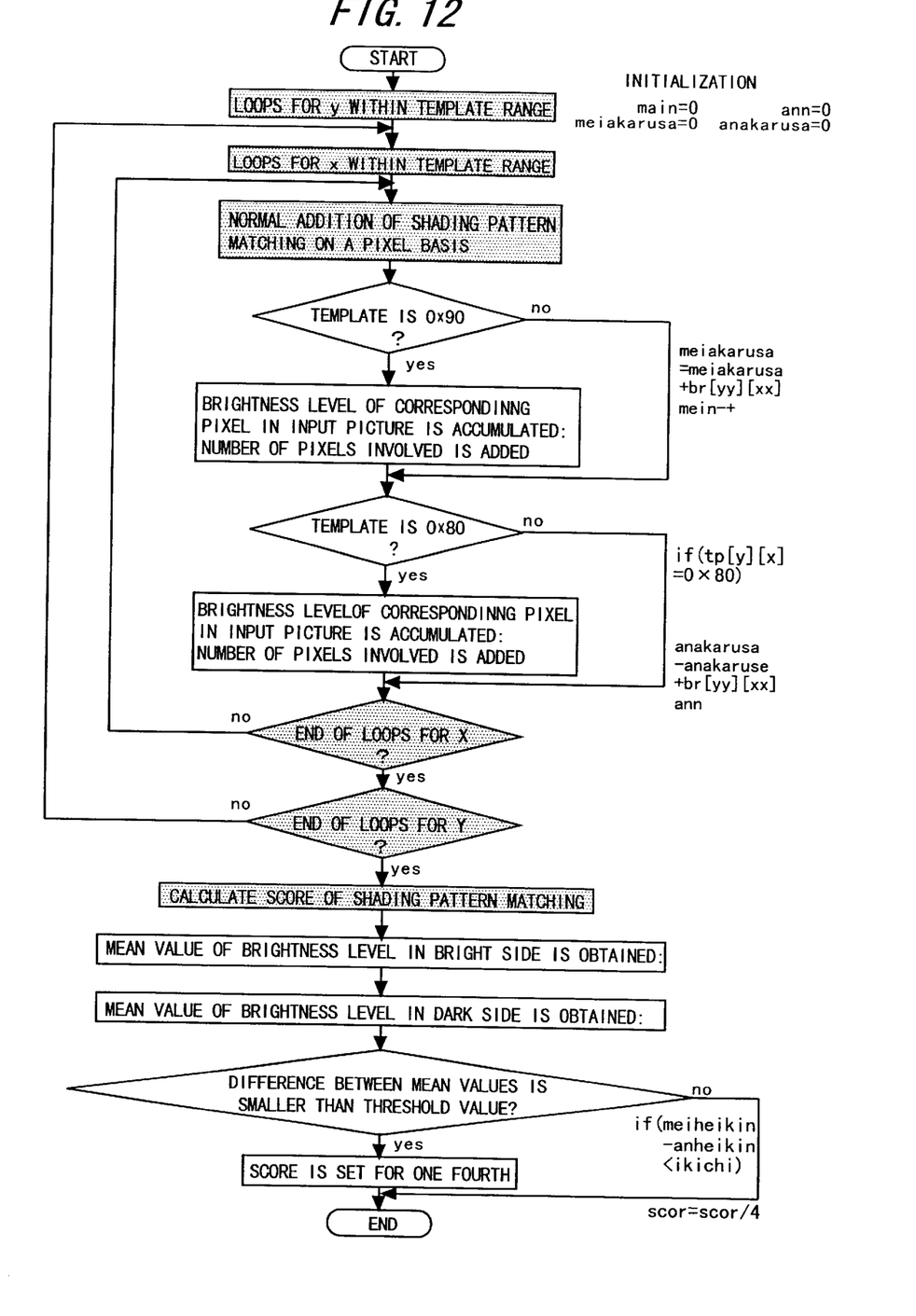
FIG. 12 is a flowchart of steps constituting a second embodiment of the invention including measures to deal with cases where there is little difference in brightness between picture portions.

The second embodiment of the invention is devised to prevent such an eventuality from occurring where there is little difference in brightness between portions. FIG. 12 is a flowchart of steps constituting the second embodiment for computing scores through shading pattern matching. In FIG. 12, the steps identical to those of the first embodiment are shown shaded with dots; other steps are newly added processes.

In FIG. 12, loops for template ranges in the Y and X directions are set first. Pattern matching is then carried out using the shading pattern matching method based on normalized correlation. Specifically, the expression (1) above is used to compute the degree of coincidence in shading pattern matching. Computations using the above expression are not performed on those pixels in the template which have zeros written therein.

The bright portion in the template is programmed as "0×90." A mean value of brightness of the pixels corresponding to "0×90" in the input picture is obtained at the time of matching. To acquire the mean value involves adding up brightness values of the input picture only where the template is "0×90" with the "y" and "x" coordinates changed pixel by pixel, and dividing the accumulated value by the number of pixels corresponding to "0×90." Similar computations are performed where the dark portion in the template is programmed as "0×80." That is, a mean value of brightness of the pixels corresponding to "0×80" in the input picture is obtained by adding up brightness values of the input picture only where the template is "0×80" with the "y" and "x" coordinates changed pixel by pixel, and by dividing the accumulated value by the number of pixels corresponding to "0×80." If the difference between the two mean values is found smaller than a predetermined threshold value, the matching score is set for one fourth. The threshold value should preferably be the smallest at which a distinction in brightness can be observed by the TV camera.

As described, there may be a match between portions in terms of the ratio of template brightness changes even if the changes are small. In such a case, the second embodiment of the invention reduces score values of shading pattern matching so as to avoid detecting erroneously a nonexistent notch on the notch-free plane.

Third Embodiment

Figure 13:
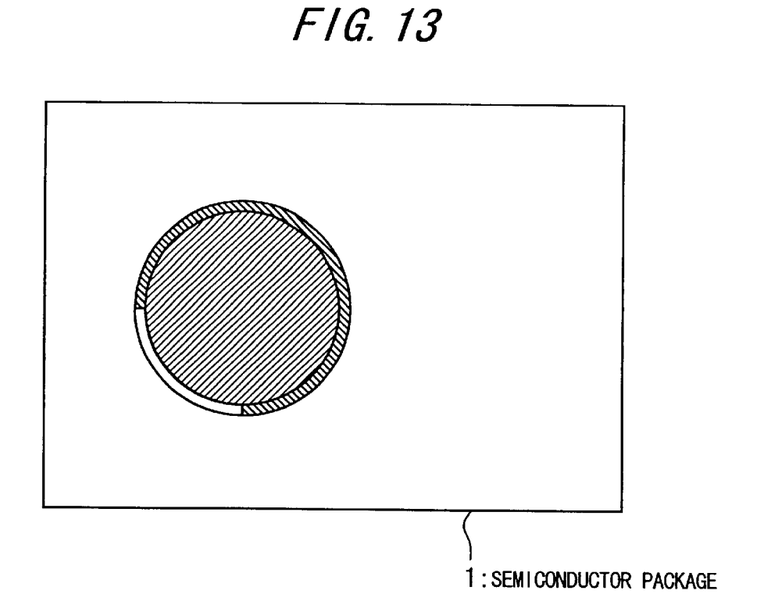
FIG. 13 is a schematic view of a case where a notch edge gleams under illumination.

Under certain illuminating conditions, a gradient edge portion around the notch circumference may appear gleaming. For example, as shown in FIG. 13, the bottom left edge portion of the notch may gleam while the remaining edge portion remains dark. The gleaming location varies depending not only on the illumination conditions but also on the subtle mold variations. This means that a single lot of semiconductor packages may contain packages with their notches having different gleaming edge portions. In such cases, high scores are not available with the basic type of shading pattern matching discussed in connection with the prior art. This makes it impossible to conduct notch inspection on a stable basis. The problem of the gleaming notch edge is bypassed by the third embodiment of the invention as described below.

Figure 14:
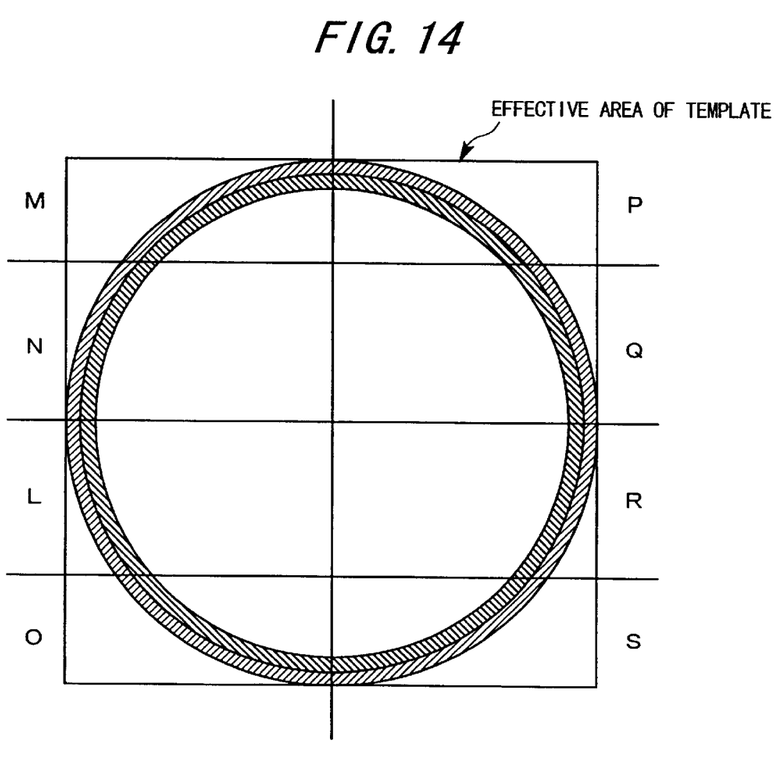
FIG. 14 is a schematic view of a template for use by a third embodiment of this invention, the template being divided into eight portions.

Which part of the notch gleams depends on the semiconductor package 1 and the lighting fixture 7. In dealing with a varying location that gleams on the same type of semiconductor packages, the template is divided into eight parts (M, N. L, O, P, Q, R, S) as shown in FIG. 14 to clarify which portion of the notch gleams and which portion is dark. The gleaming portion is recognized as follows: mean values of brightness are obtained regarding the pixels corresponding to "0×90" and "0×80" in the template as discussed above in connection with the second embodiment. Recognition of the gleaming portion is based on the fact an inner portion of the notch appears bright instead of dark as should usually be the case. At the time of pattern matching, computations are carried out with the "0×90" and "0×80" pixels swapped in the template where brightness gradations appear in reverse order of what they usually are.

Figure 15:
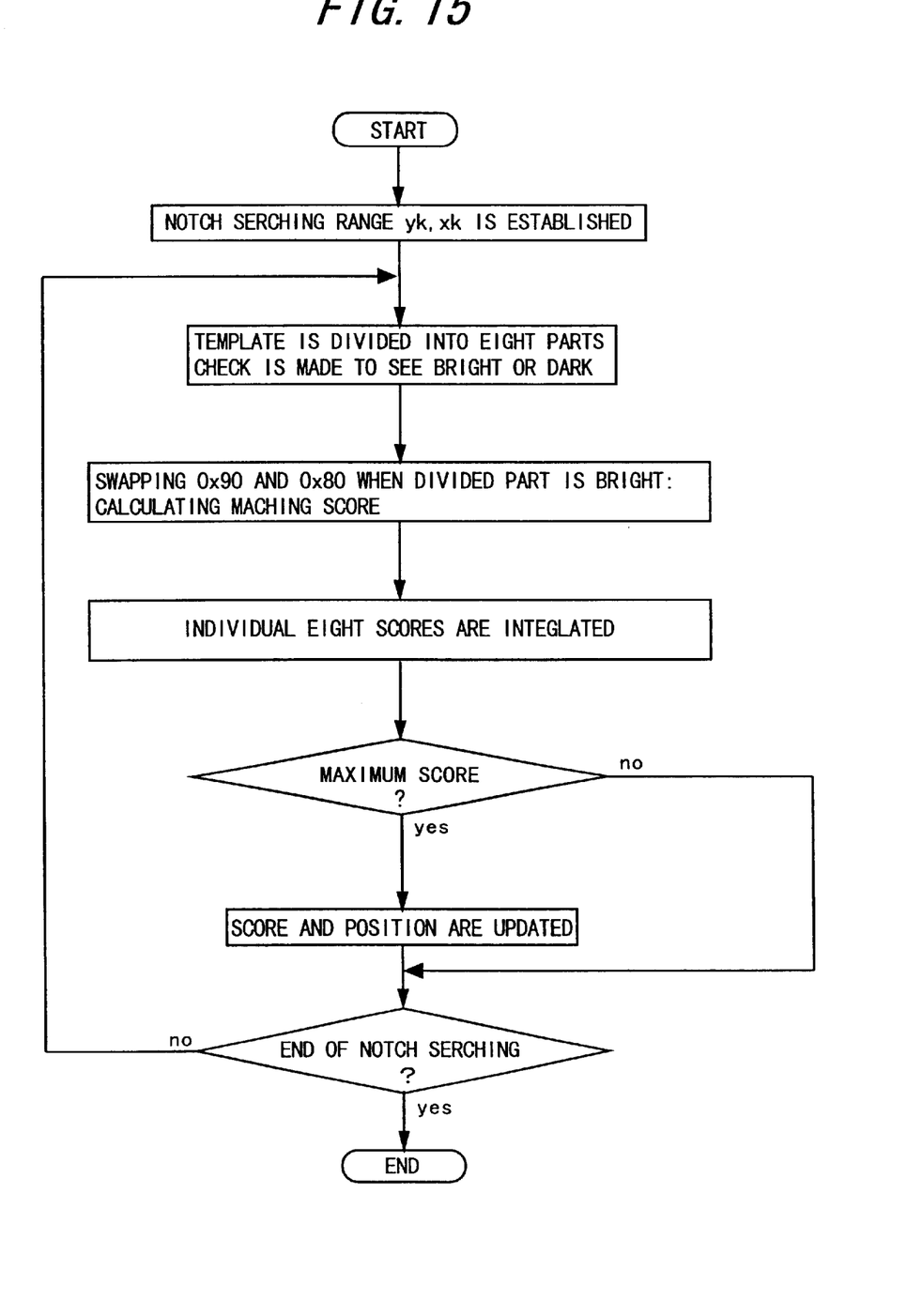
FIG. 15 is a flowchart of steps constituting a notch inspection method practiced as the third embodiment based on shading pattern matching.
Figure 16:
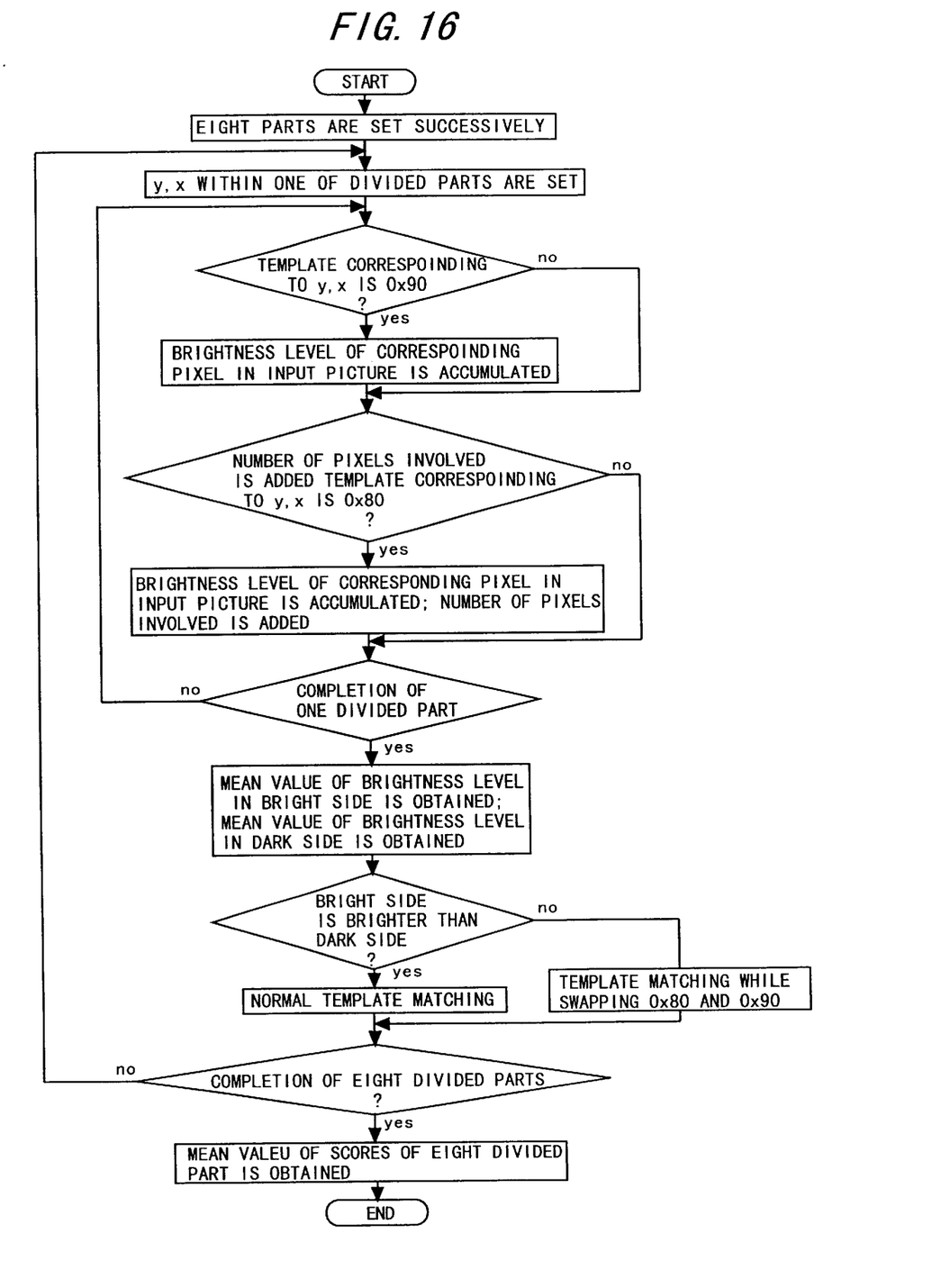
FIG. 16 is a flowchart of steps showing details of template matching performed by the third embodiment.

FIG. 15 is an overall flowchart of steps outlining a notch inspection method through shading pattern matching practiced as the third embodiment of the invention. FIG. 16 is a detailed flowchart of steps for finding the order of brightness gradations in the eight divisions of the template.

The notch inspection by the third embodiment is outlined below by referring to FIG. 15. After notch searching ranges yk and xk have been set, the template is divided into eight parts. Checks are made to see if each of the eight divisions is bright or dark. If a given division turns out to be bright, the score of pattern matching is computed by swapping the "0×90" and "0×80" pixels. The scores thus obtained individually for the eight divisions are added up. If the accumulated score is judged to be the highest so far, the score and the position coordinates in effect at that point are updated. The results are used to determine the degree of coincidence between the template and the semiconductor package in question.

Described below with reference to FIG. 16 is how to determine the brightness of the template divisions established for the third embodiment as well as how to perform computations of pattern matching.

1. Loops are first set in which the eight divisions of the template are computed successively.

2. Loops are set in which to increment "y" and "x" coordinates by one pixel at a time in order to search each of the eight divisions for one pixel at a time.

3. If the bright template portion of "0×90" applies, then brightness levels of the corresponding pixels in the input picture are accumulated, and the number of the pixels involved is added. Likewise, if the dark template portion of "0×80" applies, then brightness levels of the corresponding pixels in the input picture are accumulated, and the number of the pixels involved is added.

4. When a single loop of the eight divisions is completed, mean values of the brightness levels on the bright and dark sides in the picture portions are obtained.

5. If the mean brightness of the bright side is judged to be higher than that of the dark side upon comparison, then shading template matching is carried out as usual. If the result of the comparison is inverse, then the "0×90" and "0×80" pixels in the template are swapped for matching computations.

6. When all loops of the eight divisions have been completed, the acquired scores are averaged. The result provides a score value of pattern matching computations in one position within the notch searching range. This process is indicated by reference character A in FIG. 15.

Meanwhile, the third embodiment requires a function that would diminish matching scores where brightness changes are limited as described above in connection with the second embodiment. However, that function is not relevant to the description herein and is thus omitted for simplification.

The method described above constitutes a basic procedure according to the invention. A more simplified method may alternatively be devised whereby "0×90" pixels are switched to "0×110" pixels and "0×80" to "0×130" only in regions judged to have brightness gradations in inverse order of what they usually are. The alternative method, if implemented, will not lower scores appreciably.

According to the third embodiment, as described, the template is divided into a plurality of parts. Checks are made to see which division of the template appears gleaming. The "0×90" and "0×80" pixels in the template are swapped for pattern matching computations only if the brightness gradations detected upon pattern matching are judged to be in the reverse order. This makes it possible to perform notch inspection stably without lowering score values of shading pattern matching where the notch edge portion partially gleams under certain illuminating conditions.

According to the first aspect of the present invention, a template is created so as to characteristically express brightness gradations of the notch edge, i.e., to represent the notch edge in pixels constituting contiguous bright and dark portions of the edge, whereby shading pattern matching is carried out. If brightness gradations on the satin finished package surface are the same as those at the notch bottom, the inventive method still permits highly accurate notch inspection without lowering matching score values.

According to the second aspect of the present invention, computations of shading pattern matching are performed only for portions of the notch edge where brightness changes. This variation of the invention permits acquisition of high matching scores without experiencing irregularities even where characters are engraved inside the notches.

According to the third aspect of the present invention, the template may be created not on the basis of any picture under inspection but in accordance with notch size information. This makes it possible to carry out notch inspection with high precision.

According to the fifth aspect of the present invention, the input picture may be divided into a plurality of parts. Checks are made to see which portion of the notch edge is gleaming. Where brightness gradations in some parts are in reverse order of what they usually are, brightness of the template according to these divisions may be swapped for pattern matching computations. This variation of the invention permits stable notch inspection without lowering score values of shading pattern matching where notch edge portions are partially gleaming under varying illuminating conditions.

Further, the present invention is not limited to these embodiments, but variations and modifications maybe made without departing from the scope of the present invention.

The entire disclosure of Japanese Patent Application No. Hei 11-240846 filed on Aug. 27, 1999 including specification, claims, drawings and summary are incorporated herein by reference in its entirety.

What is claimed is:

1. A notch inspection apparatus for inspecting notches of target objects based on shading pattern matching, said apparatus comprising:

means for creating a template which characteristically represents brightness-varying portions on a notch edge;

a camera for taking a picture to be inspected of the target object;

means for performing shading pattern matching between said template and said picture to be inspected; and means for determining the presence of a notch on said target object based on the result of the shading pattern matching wherein said notch edge is represented by first pixels and second pixels contiguous each other, said first pixels corresponding to a bright portion and said second pixels corresponding to a dark portion.

2. A notch inspection method for inspecting notches of target objects based on shading pattern matching, said method comprising the steps of:

creating a template which characteristically represents brightness-varying portions on a notch edge;

taking a picture to be inspected of the target object by using a camera;

performing shading pattern matching between said template and said picture to be inspected; and determining the presence of a notch on said target object based on the result of the shading pattern matching, wherein said notch edge is represented by first pixels and second pixels contiguous each other, said first pixels corresponding to a bright portion and said second pixels corresponding to a dark portion.

3. The notch inspection method according to claim 2 wherein computations of said shading pattern matching are performed only for said brightness-varying portions.

4. The notch inspection method according to claim 2 further comprising a step for obtaining information regarding to the notch by using an input device other than said camera; and wherein said template is created on the basis of said information.

5. The notch inspection method according to claim 2 further comprising the steps of:

detecting brightness difference between bright portion and a dark portion in said picture to be inspected; and determining whether said brightness difference is smaller than a predetermined threshold value.

6. The notch inspection method according to claim 5 further comprising a step for lowering a score value of coincidence in shading pattern matching when said brightness difference is smaller than the predetermined threshold value.

7. A notch inspection method for inspecting notches of target objects based on shading pattern matching, said method comprising the steps of:

creating a template which characteristically represents brightness-varying portions on a notch edge:

taking a picture to be inspected of the target object by using a camera;

performing shading pattern matching between said template and said picture to be inspected;

determining the presence of a notch on said target object based on the result of the shading pattern matching, dividing said notch edge depicted in said picture to be inspected to a plurality of divided parts;

obtaining, in each of said divided parts, brightness level of a region corresponding to a bright portion of said template as well as brightness level of a region corresponding to a dark portion of said template; and swapping the bright portion and the dark portion of said template at a region corresponding to a divided part when bright and dark relationship in the divided part is inverse of that of said template.

* * * * *